United States Patent
Ohba (10) Patent No.: US 7,263,622 B2
(45) Date of Patent: Aug. 28, 2007

(54) POWER-SAVING DEVICE FOR CONTROLLING CIRCUIT OPERATION, AND INFORMATION PROCESSING APPARATUS

(75) Inventor: Akio Ohba, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 333 days.

(21) Appl. No.: 10/860,629

(22) Filed: Jun. 2, 2004

(65) Prior Publication Data

US 2005/0024365 A1 Feb. 3, 2005

(30) Foreign Application Priority Data

Jul. 30, 2003 (JP) .............................. 2003-283244
Dec. 1, 2003 (JP) .............................. 2003-402082

(51) Int. Cl.
*G09G 3/36* (2006.01)

(52) U.S. Cl. ...................... 713/323; 713/310; 713/321; 713/322; 713/324; 713/330; 713/340; 345/98; 345/89; 345/87

(58) Field of Classification Search ...................... None
See application file for complete search history.

(56) References Cited

U.S. PATENT DOCUMENTS

| | | | | |
|---|---|---|---|---|
| 5,757,365 A | * | 5/1998 | Ho .............................. | 345/212 |
| 6,611,917 B1 | * | 8/2003 | Yahara ........................ | 713/320 |
| 6,791,539 B2 | * | 9/2004 | Nakajima et al. ........... | 345/204 |
| 7,038,651 B2 | * | 5/2006 | Nitta et al. .................... | 345/98 |
| 2004/0095364 A1 | * | 5/2004 | Koyama et al. ............. | 345/690 |
| 2005/0066207 A1 | * | 3/2005 | Fleck et al. ................. | 713/320 |
| 2005/0076256 A1 | * | 4/2005 | Fleck et al. ................. | 713/320 |

FOREIGN PATENT DOCUMENTS

| | | |
|---|---|---|
| JP | 05-011730 | 1/1993 |
| JP | 10-145691 | 5/1998 |
| JP | 11-119767 | 4/1999 |
| JP | 2000-285227 | 10/2000 |
| JP | 2002-018122 | 1/2002 |
| JP | 2002-108316 | 4/2002 |

OTHER PUBLICATIONS

Japanese Patent Office, "Notification of Reason(s) for Refusal," dated Mar. 7, 2006, for corresponding Japanese Application No. 2003-402082, 8 pages.
Japanese Patent Office, "Notification of Reason(s) for Refusal" for corresponding Japanese Application No. 2003-402082, Oct. 10, 2006, 10 pages.
Japanese Patent Office, "Notification of Reason(s) for Refusal," for corresponding Japanese Patent Application No. 2003-402082, Dec. 12, 2006, 14 pages.

* cited by examiner

*Primary Examiner*—A. Elamin
(74) *Attorney, Agent, or Firm*—Fitch, Even, Tabin & Flannery (57) ABSTRACT

An information processing apparatus includes a first function block which controls rendering and a second function block which controls operation modes of the first function block. The rendering is finally performed in a display unit. The second function block shifts the operation mode to a power-saving mode in the first function block when the first function block completes generation of a screen to be rendered before completion of a unit rendering period, namely, a frame period. In the event of start of next unit rendering period, the second function block, on the other hand, shifts the power-saving mode back to a normal mode in the first function block, based on a vertical synchronizing signal indicative of the start of next unit rendering period.

14 Claims, 6 Drawing Sheets

POWER-SAVING DEVICE FOR CONTROLLING CIRCUIT OPERATION, AND INFORMATION PROCESSING APPARATUS

CROSS REFERENCE TO RELATED APPLICATIONS

The present application claims priority from Japanese Application No. 2003-283244 filed Jul. 30, 2003, and Japanese Application No. 2003-402082 filed Dec. 1, 2003, the disclosures of which are hereby incorporated by reference herein.

BACKGROUND OF THE INVENTION

1. Field of the Invention

The present invention relates to devices for controlling circuit operations and information processing apparatuses, and it particularly relates to a device for controlling the operation modes of a given circuit and an information processing apparatus utilizing said control device.

2. Description of the Related Art

High-performance information devices are today being produced in ever-smaller sizes owing to advances in high integration technology of semiconductors. For example, every one of PDAs (personal digital assistants), notebook PCs, digital cameras and portable game terminals on the market features an enriched variety of functions that have never been seen before.

However, these devices often run on batteries and are thus subject to limitations placed by the service life of the batteries. The advances and improvements in such enhanced functions have been realized by a drastic increase in the number of transistors used, but the power consumption of a fully integrated LSI, which is a single chip combining CPU and its peripheral circuits, is not at all small. And products incorporating such sophisticated functions can never be considered satisfactory products unless such functions can be used long enough. Therefore, various techniques have been proposed in the power-saving design of information processing equipment. One example as disclosed in Reference (1) in the following Related Art List is a technology for reducing power consumption in image display, by which signal processing for image signals is stopped during horizontal and vertical mute periods when images are not outputted to and displayed on the screen.

Related Art List (1) Japanese Patent Application Laid-Open No. Hei10-145691.

Transistors become smaller in size along with higher integration design of semiconductors. This results in smaller operating power required by such individual transistors. In the past, this tendency has been a contributing factor for a certain degree of power saving. However, a new problem is now known to develop when the gate width of a transistor is so small as to be less than 0.1 µm. That is, leakage current will occur even with circuits of static structure. Therefore, it is now necessary that this problem be addressed from a new angle or angles so as to achieve power-saving design for information devices in the near future.

SUMMARY OF THE INVENTION

The present invention has been made in view of the foregoing circumstances and an object thereof is to provide a technology for controlling the operation mode of a given circuit in order to achieve power saving effectively and to further provide an information processing apparatus utilizing said technology.

A device for controlling circuit operation, according to the present invention, includes: a first function block which controls rendering; and a second function block which controls an operation mode of the first function block. The second function block includes: a shift circuit which shifts the operation mode to a power-saving mode in the first function block when the first function block completes generation of a screen to be rendered within a unit rendering period before completion of the unit rendering period; and a resume circuit which shifts, in the event of start of next unit rendering period, the power-saving mode back to a normal mode in the first function block, based on a hardware signal indicative of the start of next unit rendering period.

By implementing the above structure, a chance of shifting to the power-saving mode is provided so as to meet a demand of power saving. On the other hand, the operation mode can be shifted back to the normal mode by the hardware signal when entering the next unit rendering period, so that the delay in start of rendering processing can be minimized.

According to the circuit operation control device of the present invention, the power saving of a circuit to be controlled can be flexibly and effectively realized. The information processing apparatus according to the present invention can enjoy this advantageous effect as an information processing apparatus.

It is to be noted that any arbitrary combination of the above-described structural components and expressions changed between a method, an apparatus, a system, a computer program, a recording medium having stored computer programs therein, a data structure and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

FIRST EMBODIMENT

Figure 1:
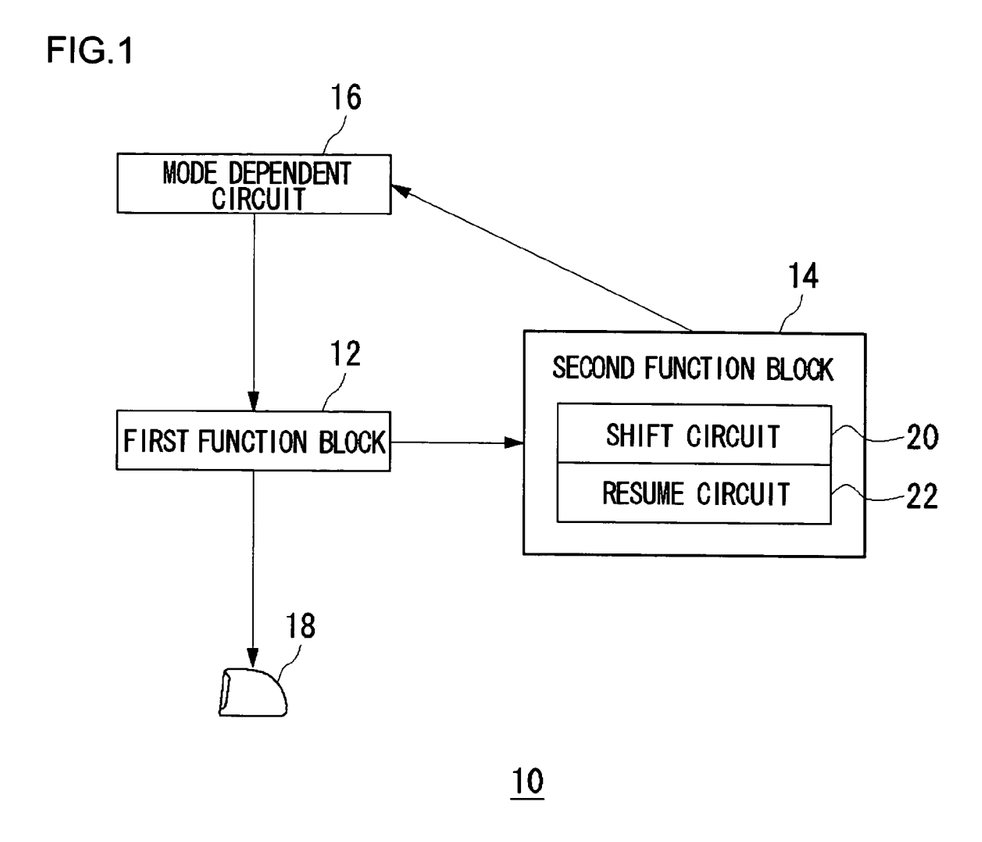
FIG. 1 shows a structure of an information processing apparatus according to a first embodiment as well as a second embodiment.

FIG. 1 illustrates a structure of an information processing apparatus 10 according to a first embodiment of the present invention. With reference to FIG. 1, the first embodiment will now be outlined. The information processing apparatus 10 includes a first function block 12 for controlling rendering and a second function block 14 for controlling an operation mode of the first function block 12. Rendering is eventually performed by a display unit 18. The second function block 14 includes the following circuits, namely, shift circuit 20 and resume circuit 22:

A shift circuit 20, which shifts the operation mode of the first function block 12 to a power-saving mode, according to an instruction from software, when the first function block 12 has completed the generation of a screen to be rendered before the end of a unit rendering period, namely, a frame period. Here the instruction from software is a signal indicative of the completion of the generation of a screen to be rendered.

A resume circuit 22, which resets the first function block 12 from the power-saving mode to a normal operation mode, according to a hardware signal, which is here a vertical synchronizing signal (hereinafter denoted by "VSYNC"), when the next frame period is started. Here the hardware signal is a start signal, from hardware, that indicates the start of next frame period.

As will be described later with reference to FIG. 2, the first function block 12 includes a central processing unit (hereinafter referred to simply as "CPU") that executes a program for processing a rendering (hereinafter referred to simply as "rendering program"). And the rendering program has a description by which instructions are given to the CPU to shift the operation mode to a power-saving mode when generation of a screen to be rendered has been completed within a single frame period.

A mode dependent circuit 16 lowers clock frequency in at least part of the first function block 12 according to the control from the shift circuit 20. Upon this, the first function block 12 shifts to a power-saving mode. "Lowering of clock frequency" as expressed herein includes "zeroing of clock frequency", which is equal to the stopping of the clock. According to another embodiment with respect to the mode dependent circuit 16, the mode dependent circuit 16 lowers power supply voltage in at least part of the first function block 12 according to the control from the shift circuit 20. Upon this, the first function block 12 shifts to a power-saving mode. "Lowering of power supply voltage" as expressed herein includes the shutting off of the power supply. When the clock is lowered or stopped, resuming a normal mode will be made more easily or more quickly. On the other hand, when the supply of power supply voltage is shut off, the above-mentioned leakage current can be reduced.

One example of an information processing apparatus 10 may be a computer executing a game (hereinafter referred to also as a "game machine"), wherein the timing for the first function block 12 is so designed that generation of a screen to be displayed in the subsequent frame period is completed before the end of a single frame period.

With a game machine, a rendering program therefor is so arranged that rendering of a frame, even if it is the one to take the longest time, is completed in a time shorter than a frame period. The rendering, if it is not completed within a frame period, will result in the so-called frame drop. This type of rendering program is therefore called a "real-time program" also. For real-time programs, the design thereof is adjusted to the frame whose rendering takes the longest time, and accordingly it is often the case that the rendering of most frames is finished by a wide margin before the end of a frame period. As a result, the CPU or graphic circuit that executes the program is left unused during a considerable portion of a frame period. Hence, during this unused period, power to such a circuit (hereinafter referred to also as a "stand-by circuit") is shut off or the clock is lowered.

With a game machine, the screen display progresses according to a game program, which is aware of a screen to be rendered in each frame period. Therefore, once the screen has been drawn, the game machine is completely free from any other processing, such as one for an arbitrary interruption as with a general computer. Hence, such a stand-by circuit may be effectively shifted to a power-saving mode without a problem. This understanding of the inventor forms the basis for the preferred embodiments.

Figure 2:
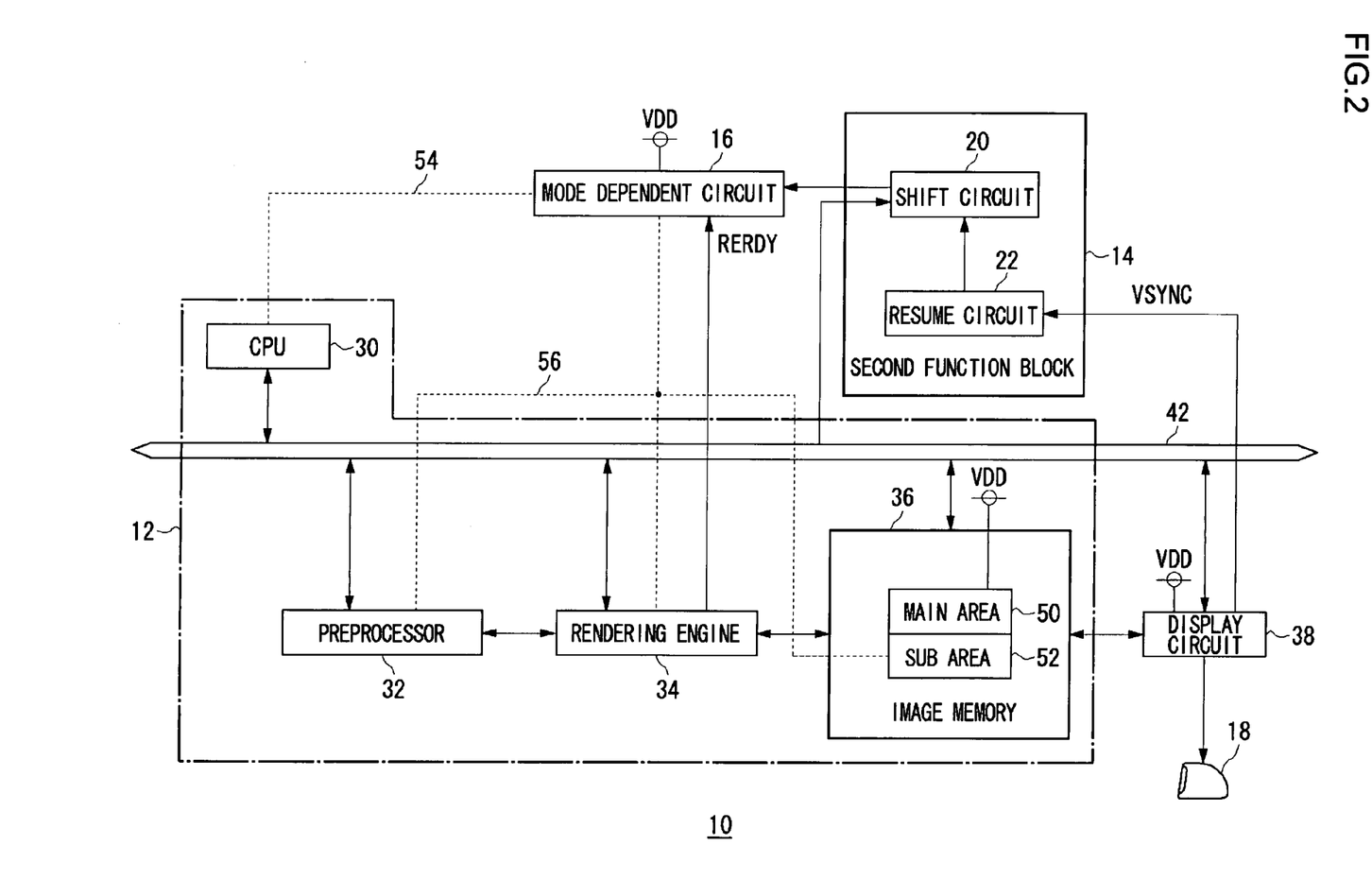
FIG. 2 shows a detailed structure of the information processing apparatus shown in FIG. 1.

FIG. 2 illustrates a detailed structure of an information processing apparatus 10 of FIG. 1. Here, the mode dependent circuit 16 is assumed to control power supply instead of clock. In FIG. 2, the chain line represents a first function block 12, the broken line a power supply line, and the solid line a normal signal line.

The first function block 12 includes a CPU 30, a preprocessor 32, a rendering engine 34 and an image memory 36. These, together with a display circuit 38 and a second function block 14, are connected to a bus 42, whereby commands and data are exchanged between each other. The bus 42 may be a local bus of the CPU 30, a general-purpose system bus or any other arbitrary bus. Since the structure in FIG. 2 is only exemplary, communications between the elements thereof may be exchanged via the bus 42 or directly via local signal lines shown or not shown therein.

The CPU 30 reads a rendering program from main memory or ROM (Read Only Memory) built therein or located in a position not shown and mainly performs processings necessary for rendering. The rendering program is implemented, for instance, as part of a game program. The preprocessor 32 generates rendering commands according to the instructions from the CPU 30 and outputs the rendering commands to the rendering engine 34. The rendering engine 34 performs the rendering on screen images and stores them, as appropriate, in the image memory 36. When all the processings to be done by the rendering engine 34 itself within a frame period are completed, the rendering engine 34 sends to the mode dependent circuit 16 a signal indicative of the completion of all the processing. This signal will be hereinafter denoted by "RERDY" meaning a ready signal of the rendering engine.

The image memory 36 includes a main area 50 which stores screen data to be continuously displayed over a frame period and a sub-area 52 which stores the other data. As will be described later, the power to the main area 50 is not shut off, whereas the power to the sub-area 52 only will be shut off. If the image memory 36 is of a double buffer structure wherein a display buffer thereof stores data to be displayed in the present frame and a rendering buffer thereof stores data to be displayed in the next frame, then these two buffers are implemented in the main area 50 because the power supply thereto must be maintained in both the frame periods. On the other hand, Z buffer and data in the working area that stores parameters for alpha blending and so forth may be implemented in the sub-area 52 because they are not needed once rendering processing is completed.

The display circuit 38 reads out data from the image memory 36 and converts them into signals in a format appropriate for a display unit 18, and the thus converted signals are outputted therefrom. The display unit 18, which may be of any structure and mode, is in need of VSYNC or equivalent signals (hereinafter collectively referred to as "VSYNC"), which the display circuit 38 must generate. There are, however, display units that do not require VSYNC. When such a display unit 18 is used, the display circuit 38 generates the VSYNC for the second function block 14. In any case, VSYNC is not limited to a vertical synchronizing signal but may be any signal capable of setting off the generation of a new image frame. In this patent specification, VSYNC is therefore interpreted as a signal covering such broader meaning.

The second function block 14 includes a shift circuit 20 and a resume circuit 22. The shift circuit 20 causes the first function block 12 to shift to a power-saving mode at an instruction from software (hereinafter referred to as "shift instruction"). The shift instruction is placed near the end of a rendering program, and in actuality, a write operation to a system register built in the shift circuit 20 is interpreted as the shift instruction. The resume circuit 22, on the other hand, receives an input of VSYNC from the display circuit 38 and instructs to turn back to a normal mode when the signal turns active. According to the first embodiment of the present invention, the resume circuit 22 acts on the shift circuit 22, the detail of which will be described later.

Power supply voltage (hereinafter denoted by "VDD") is applied to the mode dependent circuit 16, and, depending on the mode, the VDD is either applied directly to the respective elements of the first function block 12 or shut off. According to the first embodiment, power supply is controlled differently for the CPU 30 and the other components, that is, by two power supply systems of a CPU power supply 54 for the CPU 30 and an RE power supply 56 for the other components. More specifically, a power supply terminal of the CPU 30 is connected to the CPU power supply 54, whereas power supply terminals of the preprocessor 32, the rendering engine 34 and the sub-area 52 in the image memory 36 are connected to the RE power supply 56. It is to be noted here that the main area 50 in the image memory 36 has a power supply terminal different from one for the sub-area 52 and constantly receives the application of voltage from VDD. The same is true of the display circuit 38.

Figure 3:
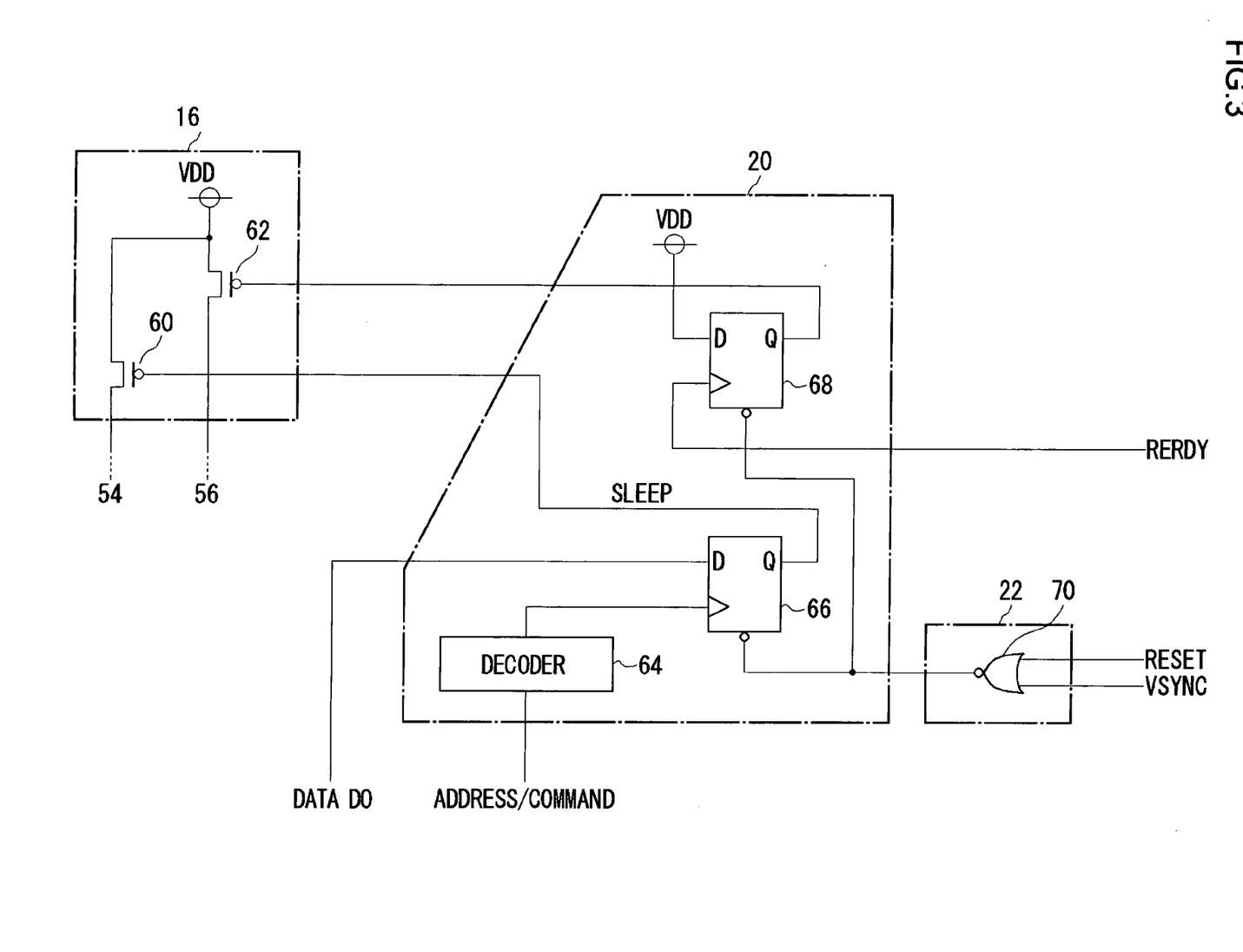
FIG. 3 is a circuit diagram showing a mode dependent circuit, a shift circuit and a resume circuit shown in FIG. 2.

FIG. 3 illustrates a shift circuit 20, a resume circuit 22 and a mode dependent circuit 16 in detail. The mode dependent circuit 16 includes a first transistor 60 and a second transistor 62 which function as analog switches between VDD and CPU power supply 54 and between VDD and RE power supply 56, respectively. The shift circuit 20 includes a decoder 64, a system register 66 and a latch 68. The system register 66 is constituted by a flip-flop, to which the shift instruction is written. It is assumed here that the address of the system register 66 is "address A" and the writing of "1" is a shift instruction. The initial value of the system register 66 is "0". Input D of the system register 66 is coupled to data D0, which is the least significant bit of data on a bus 42. The decoder 64 turns the output active when a write command is issued to address A. This output is coupled to a trigger terminal of the system register 66. Output Q of the system register 66 is an active high signal (hereinafter denoted by "SLEEP") which turns active at the issuance of a shift instruction. The SLEEP is coupled to the gate of the first transistor 60.

The latch 68 is constituted by a flip-flop, which latches a RERDY signal. Input D of the latch 68 is pulled up to VDD, RERDY is inputted as a trigger signal, and output Q is coupled to a gate of the second transistor 62.

The resume circuit 22 includes a NOR gate 70. Input to the NOR gate 70 is a reset signal that goes high-active during the reset period of the information processing apparatus 10 (hereinafter denoted by "RESET") and VSYNC. Output from the NOR gate 70 is coupled to the system register 66 and the reset terminal of the latch 68.

Figure 4:
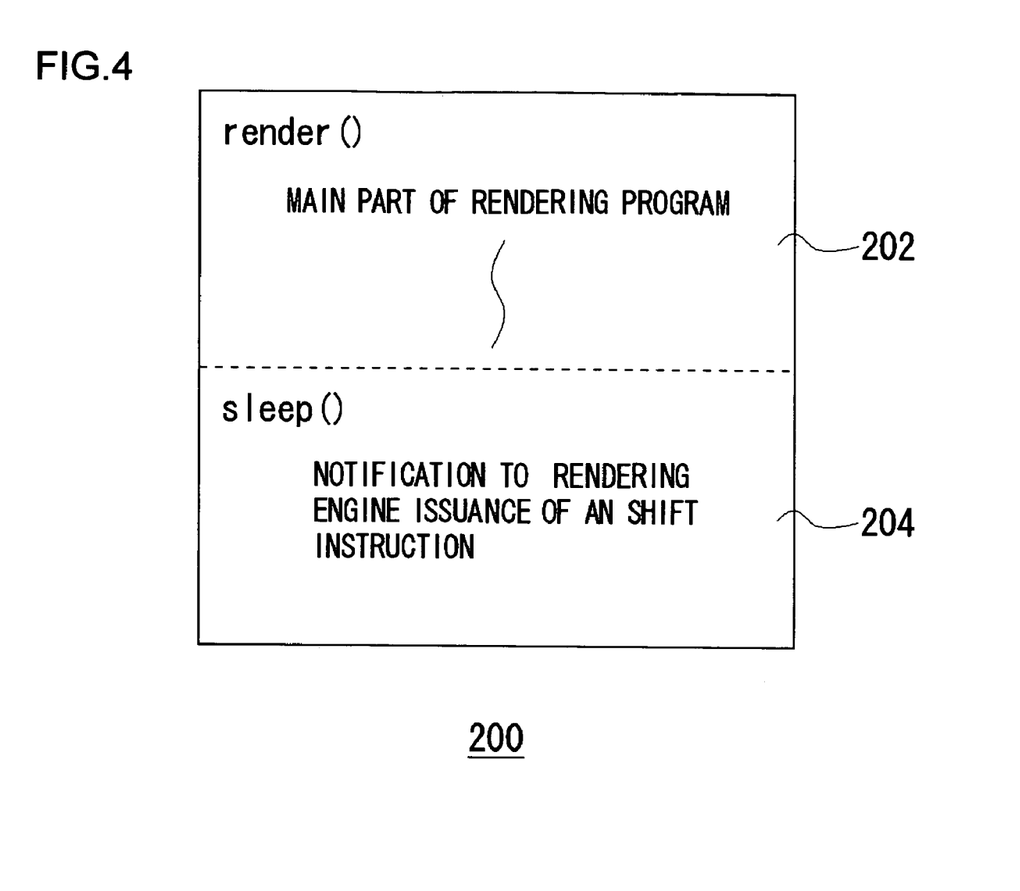
FIG. 4 illustrates a description of a rendering program executed by an information processing apparatus according to the first embodiment as well as the second embodiment.

FIG. 4 illustrates an example of description of a rendering program 200 for rendering and subsequent shift to a power-saving mode. In FIG. 4, render( ) is a main part 202 of the program for rendering, which, as an aforementioned real-time program, is so designed as to complete the rendering within a frame period.

On the other hand, sleep( ) is a shift instructing part 204, which describes two different processings. The first processing is a processing in which the CPU 30 notifies the rendering engine 34 to the effect that "instructions or commands will not be issued any more in this frame period". Upon receiving this notice, the rendering engine 34 realizes that it is only required to process the instructions or commands currently present within itself for fetching, decoding, executing or the like. The rendering engine 34 will then assert RERDY when the processing is completed. The second processing in sleep( ) is the issuance of a shift instruction. This is a processing in which "1" is written to "address A".

Figure 5:
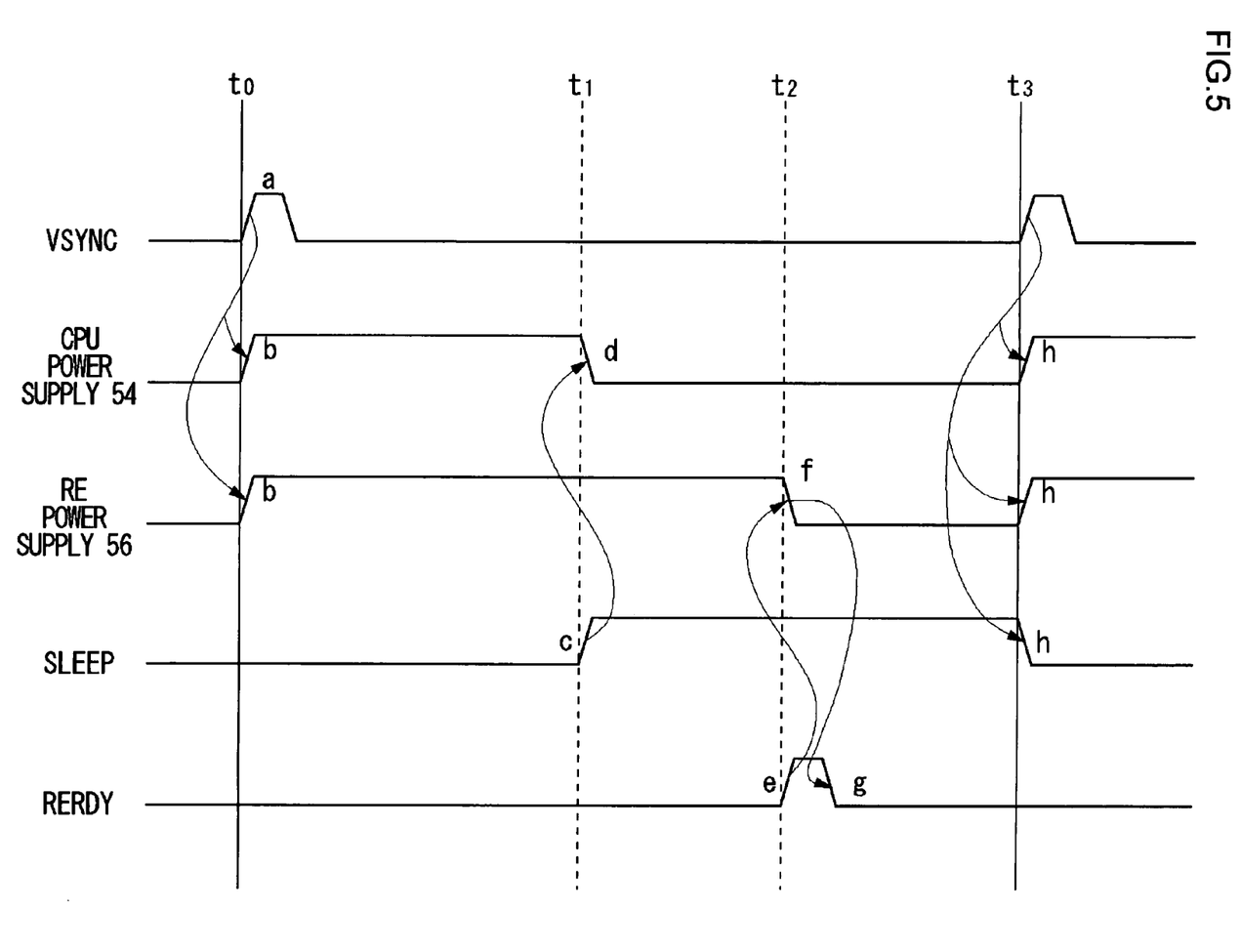
FIG. 5 is a timing chart showing transitions, within a frame, between a normal mode and a power-saving mode according to the first embodiment.

Control of the operation mode in the information processing apparatus 10 structured as above is described here using a timing chart shown in FIG. 5. The frame period under consideration in FIG. 5 is one starting at time $t_0$ and ending at time $t_3$. With the start of the frame period, VSYNC turns active in a pulse (a in FIG. 5). Thus, the output of the NOR gate 70 goes low, the system register 66 and the latch 68 are reset, and the SLEEP and the output of the latch 68 go low. As a result, the gates of the first transistor 60 and the second transistor 62 are both set low, thereby turning these transistors on, and thus VDD will be applied to the CPU power supply 54 and the RE power supply 56 (b in FIG. 5). As a result, the power supply voltage is applied to all the elements, thus starting a normal mode.

The processing by the CPU 30 for this frame, namely, the function render( ) in FIG. 4 is finished at $t_1$. Following this, the CPU 30 begins the processing of the function sleep( ), in which it notifies the rendering engine 34 of its temporary stop of a command and then issues a shift instruction. At the issue of the shift instruction, the decoder 64 generates a trigger signal to the system register 66. At this point, data D0 of the system register 66 is "1". Hence, "1" is written in the system register 66, and thereby SLEEP, which is the output of the system register 66, goes high (c in FIG. 5). Thus, the first transistor 60 turns off, the CPU power supply 54 is cut off from VDD, and the power supply to the CPU 30 is shut off (d in FIG. 5).

Thereafter, the processing continues within the rendering engine 34, and when the processing is completed at time $t_2$, the rendering engine 34 sets RERDY high (e in FIG. 5). As a result, the output of the latch 68 goes high, the second transistor 62 turns off, the RE power supply 56 is cut off from VDD, and the power to the rendering engine 34 and other elements is shut off (f in FIG. 5). As power supply to the rendering engine 34 is shut off, the RERDY is also brought low (g in FIG. 5). This creates a state in which all the power supply that can be shut off at time $t_2$ is off. However, since the power to the main area 50 of the image memory 36 and the display circuit 38 is being supplied from VDD, the display will be performed normally even during the remaining period of the present frame. A shift to a power-saving mode is thus completed.

Then at time $t_3$, the present frame period comes to an end, and VSYNC will be asserted high at the beginning of the next frame period. Thus, the system register 66 and the latch 68 are reset, and their output become low. As a result, the first transistor 60 and the second transistor 62 become on, and VDD is applied to the CPU power supply 54 and the RE power supply 56 (h in FIG. 5). This causes to resume a normal mode.

As described above, according to the first embodiment, the power supply voltage is shut off at the completion of rendering, which contributes to power saving. As a frame period is almost on the order of a second, this can be accomplished conveniently with a sufficient time margin for the breaking and restoring of power supply. Furthermore, there is no apprehension of the delay in the rendering processing because a normal mode can be resumed by the use of a hardware signal of VSYNC as a trigger. In real-time programs such as those for game machines, the combination of operations and their timings are known in advance, so that this embodiment can be adopted after ascertaining that no adverse effects is caused by the shutdown of power supply.

SECOND EMBODIMENT

The first embodiment is based on a shift to a power-saving mode by shutting power off. A second embodiment according to the present invention concerns a shift to a power-saving mode by the stoppage of clock instead of the shutting-off of power. Since the second embodiment has many features in common with the first embodiment and thus the Figures therefor will be almost the same, the following description will center around the differences therefrom based on the first embodiment, using the same Figures.

The basic structure of the second embodiment, as shown in FIGS. 1 and 2, is the same as the one of the first embodiment. However, the processing of the mode dependent circuit 16 in FIG. 1 is not the shutting-off of power supply but the stopping of clock for the CPU 30, the rendering engine 34 and so forth. A reference clock (not shown) is inputted to the mode dependent circuit 16 in FIG. 2, and output from the mode dependent circuit 16 is given, as clock, to the CPU 30, the rendering engine 34 and so forth. In FIG. 3, according to the second embodiment, the source electrodes of the first transistor 60 and the second transistor 63 are not coupled to VDD, but to clock signals matching the clock frequency of the CPU 30 and the rendering engine 34, respectively. FIGS. 4 and 5 apply the same way as in the first embodiment. In FIG. 5, however, clock for the CPU 30 is supplied normally during the time $t_0$ to $t_1$ when the CPU power supply 54 is on, whereas the clock therefor is stopped during the time $t_1$ to $t_3$ when the CPU power supply 54 is off. Similarly, clocks for the rendering engine 34 and so forth are supplied normally during the time $t_0$ to $t_2$ when the RE power supply 56 is on, whereas the clocks therefor are stopped during the time $t_2$ to $t_3$ when the RE power supply 56 is off. Therefore, the same advantageous effect of power saving as in the first embodiment can be achieved in this second embodiment.

The present invention has been described based on the embodiments, and the above first and second embodiments are only exemplary. It is therefore understood by those skilled in the art that there exist other various modifications and such modifications are encompassed by the scope of the present invention. Such modified examples will be described hereinbelow.

Modification 1

In the first and second embodiments, the first function block 12 includes a CPU 30, a preprocessor 32, a rendering engine 34 and an image memory 36. However, the structure has degrees of freedom in the design thereof. For example, the first function block 12 may not include the CPU 30 or preprocessor 32, or may not include the image memory 36. Conversely, the structure may be such that the display circuit 38 is further included in the first function block 12.

Modification 2

In the first and second embodiments, the preprocessor 32 and the rendering engine 34 are provided separately. However, the preprocessor 32 and the rendering engine 34 may be integrally structured. Alternatively, a structure may be such that the rendering engine 34 is not provided depending on a design.

Modification 3

In the first embodiment, there is provided a structure that the power to the CPU 30, the rendering engine 34 and so forth are all shut off. However, the structure may be such that the power to the CPU 30 only or the rendering engine 34 only or the like is shut off. Furthermore, the timing at which the power is shut off in the rendering engine 34 may be set differently, so that there may be provided a structure such that the power is sequentially shut off in the order that the processing is completed. In the second embodiment, there is provided a structure that the clocks of the CPU 30, the rendering engine 34 and so forth are all stopped. However, the structure may be such that the clock of the CPU 30 only or the rendering engine 34 only or the like is stopped. Furthermore, the timing at which the clock is stopped in the rendering engine 34 may be set differently, so that there may be provided a structure such that the clocks are sequentially stopped in the order that the processing is completed.

Modification 4

In the first embodiment, the power shutoff of not only the CPU 30 but also the rendering engine 34 and so forth represents the shifting of the operation mode. However, the power shutoff of the CPU 30 alone may represent the shifting of the operation mode.

Modification 5

A modified structure may be realized by combining the first embodiment and the second embodiment. For example, the power of CPU 30 is shut off, whereas the only clock of rendering engine 34 and so forth is stopped. The converse thereof may also be done, that is, the power to the rendering engine 34 and so forth is shut off, whereas only the clock of the CPU 30 is stopped.

Modification 6

In the first embodiment, the power supply voltage is shut off. However, the power supply voltage may be lowered instead of being completely cut off, as the case may be. In such a case, resuming the normal mode can be expedited. Moreover, the data or circuitry state can be retained in some cases. In the similar manner, the frequency may be lowered in the second embodiment instated of the clock being completely stopped. In that case, the CPU 30 will not be stopped completely, so that the CPU 30 can be put to a stand-by state or other arbitrary processing can be executed. In any of the above cases, the power can of course be saved by the power-saving mode as compared to the normal mode. It is to be noted that selection for the power can be made between the shutting off or lowering thereof whereas selection for the clocks can be made between stoppage and lowering of the frequency thereof, and which to be selected can be determined for each element concerned.

Modification 7

Figure 6:
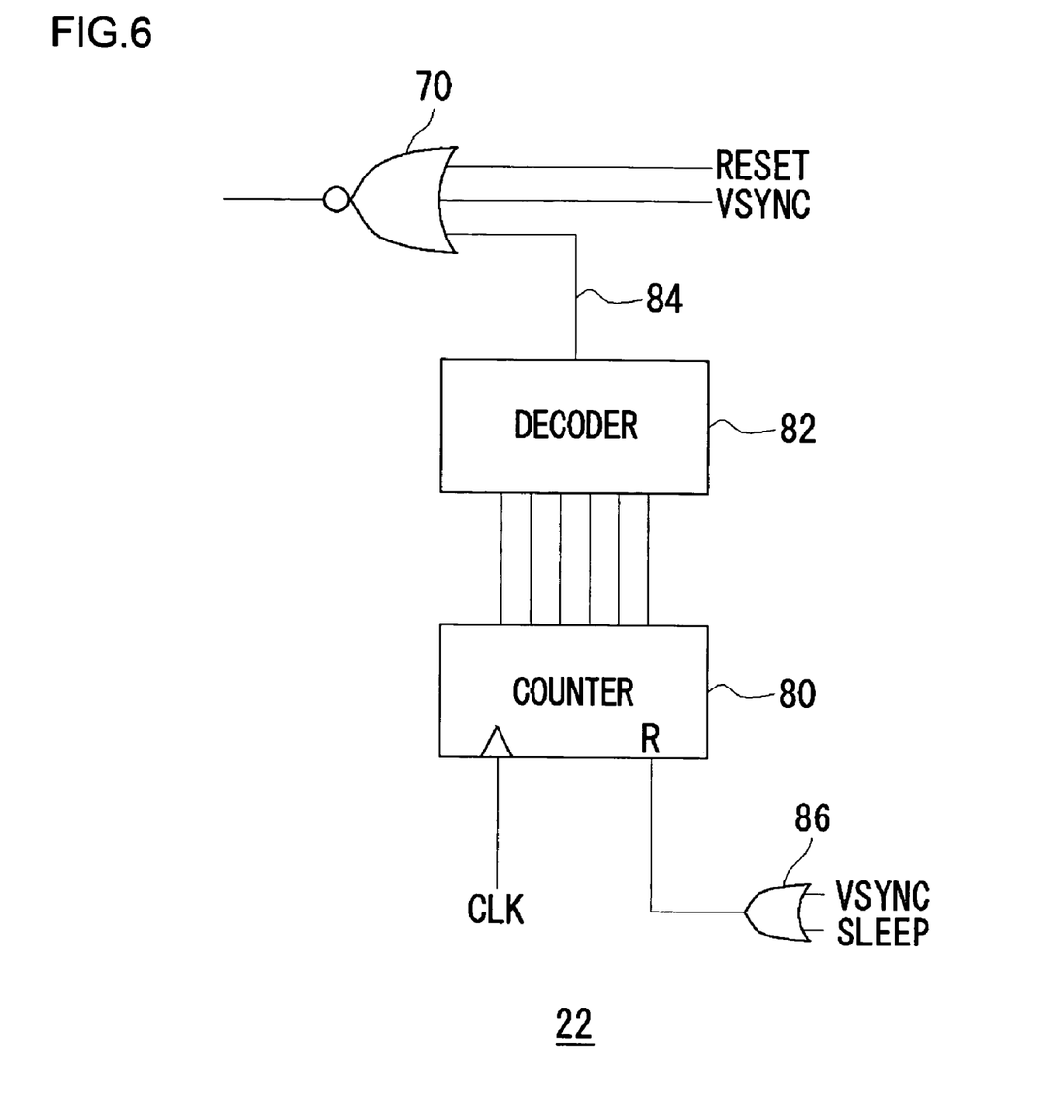
FIG. 6 shows a structure of a resume circuit according to a modified example based on the first and second embodiments.

In any of the above embodiments, whether shifting to the power-saving mode is to be adopted or not may be decided based on the remaining period of a frame at that time. The mode transition between the normal mode and the power-saving mode may cause more power dissipation when the remaining period of a frame is less than a threshold value. FIG. 6 shows a modified example of the resume circuit 22 to cope with such a situation. Compared with the resume circuit 22 shown in FIG. 3, a counter 80 and a decoder 82 are additionally provided, and the NOR gate 70 has three inputs. The structure other than those is the same as that of FIG. 3.

The counter 80 counts reference clocks (denoted by CLK) to measure the remaining period. Output of an OR gate is coupled to a reset terminal of the counter 80. VSYNC and SLEEP are inputted to this OR gate. Thus, whenever VSYNC goes high, namely, whenever the count value is cleared to zero in the outset of the frame period and SLEEP is asserted during the frame period, the count value continues being cleared to zero thereafter. The decoder 82 causes an output 84 to turn active when the count value becomes greater than or equal to a certain N. This N is determined relative to the remaining period. Similar to FIG. 3, RESET and VSYNC are inputted to the NOR gate 70. In addition, the output 84 of the decoder 82 is inputted to the NOR gate 70.

According to the above structure, when there is enough remaining period in a certain frame period, the output of the counter 80 does not reach yet to N and the output 84 remains low, so that the decoder 82 does not influence the NOR gate 70. Thus, the structure will result in the same circuit as shown in FIG. 3 and the transition to the power-saving mode can be freely done. On the other hand, when the remaining period becomes shorter, the output of the counter 80 reaches N and the output 84 of the decoder 82 goes high. As a result, the output of the NOR gate 70 becomes low, and the system register 66 and the latch 68 are reset, thus forcibly switching the operation mode to the normal mode. Therefore, it is prohibited to unnecessarily shift to the power-saving mode. In order to avoid that the operation mode returns to the normal mode when the output of the counter 80 reaches N after having already been switched to the power-saving mode, there is arranged a structure such that the output of the OR gate 86 becomes high and the counter 80 is cleared to zero when SLEEP is asserted.

Modification 8

In the first and second embodiments, the operation mode is shifted to the power-saving mode upon receipt of an instruction from software. However, a structure capable of shifting the operation mode to the power-saving mode may be provided at hardware side. For example, an idle timer is provided inside the rendering engine 34, which may assert RERDY. The transition to the power-saving mode may be executed when there is no instruction given from the CPU 30 for a predetermined length of time and the internal processing of the rendering engine is completed. In such a case, the transistor 62 is turned off and the first transistor 60 will remain turned on in FIG. 3, so that the circuit shown in FIG. 3 needs to be modified. That is, the output of latch 68 and SLEEP are inputted to an OR gate (not shown) and the output thereof is connected to the gate of the first transistor 60. By implementing this structure, when RERDY is asserted, not only the second transistor 62 but also the first transistor is turned off so as to achieve its purpose. If a mode-shifting function is provided in the hardware side, the software coding can become easier with no need for mode shifting.

Modification 9

In FIG. 5, when the VSYNC goes high, the CPU power supply 54 and the RE power supply 56 are simultaneously restored. However, the CPU power supply 54 may be first restored followed by RE power supply 56 restored. Thereby, the processing by the CPU 30 progresses at first. Thus, a structure as follows is possible.

1. A timer which measures time lapsed after the VSYNC becomes high is provided in the CPU power supply 54 area so that the RE power supply 56 is restored after a predetermined length of time has lapsed.
2. The RE power supply 56 is restored based on a signal that changes slightly after the change of VSYNC.
3. The CPU 30 restores the RE power supply 56 after waiting for a predetermined length of time.
4. When the CPU 30 operates to send a command and so forth to the rendering engine 34 and other elements to which the power is supplied from the RE power supply 56, the RE power supply 56 is restored before such a processing.

Modification 10

In addition to the power-saving mode described in the first and second embodiments, another power-saving measure may be introduced. For example, when a level of the remaining power supply of a battery which serves as the power supply for the information processing apparatus 10 becomes lower, "data set for use with power-saving mode" where there are fewer number of objects and polygons may be used. In order to achieve this structure, it is preferable that a measurement unit for measuring the remaining amount of battery power is provided separately from a normal set of data and a data set which is simplified to alleviate the processing load is prepared. Thereby, when the remaining amount of battery power becomes less than or equal to a predetermined threshold value, the CPU 30 shifts the operation mode to the simplified data set so as to carry out the rendering processing. In this case, the rendering processing will be completed earlier, so that the power-saving effect achieved by combining this modified example with the first embodiment and/or the second embodiment is significant.

Modification 11

In the similar manner, power saving by lowering the frame rate may be implemented. For example, rendering at 60 frames per second may be reduced to rendering at 30 frames per second, thus reducing the amount of rendering processing by half. As a result, operation time of the rendering engine 34 and the like becomes shorter, so that the power-saving effect achieved by combining this modified example with the first embodiment and/or the second embodiment is significant.

Although the present invention has been described by way of exemplary embodiments, it should be understood that many changes and substitutions may further be made by those skilled in the art without departing from the scope of the present invention which is defined by the appended claims.

What is claimed is:

1. A device for controlling circuit operation, the device including:
   a first function block which controls rendering; and
   a second function block which controls an operation mode of said first function block,
   said second function block including:
      a shift circuit which shifts the operation mode to a power-saving mode in said first function block when said first function block completes generation of a screen to be rendered within a frame period before completion of the frame period; and
      a resume circuit which shifts, in the event of start of next frame period, the power-saving mode back to a normal mode in said first function block, based on a hardware signal indicative of the start of next frame period.

2. A device according to claim 1, wherein the hardware signal is a vertical synchronizing signal.

3. A device according to claim 1, wherein said first function block includes a central processing unit that executes a program for processing the rendering, and the program includes a description by which to issue an instruction to the central processing unit after completing the generation of a screen to be rendered within a frame period.

4. A device according to claim 2, wherein said first function block includes a central processing unit that executes a program for processing the rendering, and the program includes a description by which to issue an instruction to the central processing unit after completing the generation of a screen to be rendered within a frame period.

5. A device according to claim 1, wherein said second function block lowers clock frequency in at least part of said first function block, so as to shift the operation mode to the power-saving mode in said first function block.

6. A device according to claim 2, wherein said second function block lowers clock frequency in at least part of said first function block, so as to shift the operation mode to the power-saving mode in said first function block.

7. A device according to claim 3, wherein said second function block lowers clock frequency in at least part of said first function block, so as to shift the operation mode to the power-saving mode in said first function block.

8. A device according to claim 1, wherein said second function block lowers power supply voltage in at least part of said first function block, so as to shift the operation mode to the power-saving mode in said first function block.

9. A device according to claim 2, wherein said second function block lowers power supply voltage in at least part of said first function block, so as to shift the operation mode to the power-saving mode in said first function block.

10. A device according to claim 3, wherein said second function block lowers power supply voltage in at least part of said first function block, so as to shift the operation mode to the power-saving mode in said first function block.

11. A device according to claim 8, wherein said first function block includes a memory element and the memory element includes a main area which stores screen data to be continuously displayed over the frame period and a sub-area which stores the other data and wherein, if the power of the memory element is to be shut off, said second function block shuts off the power supply of the sub-area only.

12. A device according to claim 9, wherein said first function block includes a memory element and the memory element includes a main area which stores screen data to be continuously displayed over the frame period and a sub-area which stores the other data and wherein, if the power of the memory element is to be shut off, said second function block shuts off the power supply of the sub-area only.

13. A device according to claim 10, wherein said first function block includes a memory element and the memory element includes a main area which stores screen data to be continuously displayed over the frame period and a sub-area which stores the other data and wherein, if the power of the memory element is to be shut off, said second function block shuts off the power supply of the sub-area only.

14. An information processing apparatus in which the timing of a rendering processing block is so designed that generation of a screen to be displayed in a single frame period is completed within the single frame period, the apparatus including:
   a shift circuit which shifts an operation mode to a power-saving mode in the rendering processing block when the rendering processing block completes generation of a screen to be rendered within the frame period; and
   a resume circuit which shifts, in the event of start of next frame period, the power-saving mode back to a normal mode in the rendering processing block, based on a hardware signal indicative of the start of next frame period.

* * * * *